June 9, 1925.　　　　　W. F. BIELICKE　　　　　1,540,752

OBJECTIVE LENS SYSTEM

Filed March 8, 1924

Focus 100 mm　Diameter 42 mm

| | | | $n_D$ | $n_{G'}$ |
|---|---|---|---|---|
| $r_1$ +47.4 | $d_1$ 7.3 | I | 1.60960 | 1.62273 |
| $r_2$ +680.4 | $l_1$ 15.0 | | | |
| $r_3$ −53.1 | $d_2$ 2.0 | II | 1.64927 | 1.67489 |
| $r_4$ +47.4 | $l_2$ 6.1 | | | |
| $r_5$ +763.3 | $d_3$ 4.1 | III | 1.60960 | 1.62273 |
| $r_6$ −172.1 | $l_3$ 1.4 | | | |
| $r_7$ +544.3 | $d_4$ 5.8 | IV | 1.60960 | 1.62273 |
| $r_8$ −49.0 | | | | |

Focus 100 mm　Diameter 50 mm

| | | | $n_D$ | $n_{G'}$ |
|---|---|---|---|---|
| $r_1$ + 56.0 | $d_1$ 9.0 | I | 1.60958 | 1.62273 |
| $r_2$ −1500.0 | $l_1$ 17.0 | | | |
| $r_3$ − 55.0 | $d_2$ 2.5 | II | 1.67330 | 1.70141 |
| $r_4$ + 80.0 | $l_2$ 12.0 | | | |
| $r_5$ − 373.0 | $d_3$ 7.0 | III | 1.60958 | 1.62273 |
| $r_6$ − 48.0 | $l_3$ 1.5 | | | |
| $r_7$ + 194.0 | $d_4$ 5.0 | IV | 1.60958 | 1.62273 |
| $r_8$ − 194.0 | | | | |

Witnesses

Hugh T. Gramatke

Else Stange

Inventor

William F. Bielicke

Patented June 9, 1925.

1,540,752

UNITED STATES PATENT OFFICE.

WILLIAM F. BIELICKE, OF BERLIN-NEUKOLLN, GERMANY.

OBJECTIVE LENS SYSTEM.

Application filed March 8, 1924. Serial No. 697,931.

*To all whom it may concern:*

Be it known that I, WILLIAM F. BIELICKE, a citizen of the United States of America, residing at 15/111 Hertzbergstr., Berlin-Neukolln, Germany, have invented certain new and useful Improvements in Objective Lens Systems, of which the following is a specification.

This invention relates to objective lens systems, such as are used for photographic, microscopic, projection and similar purposes, the chief object of the invention being to provide a lens system of this character corrected for spherical and chromatic aberration, astigmatism, distortion and coma and having a very large relative aperture.

Figure 1:
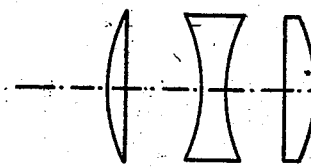
Figure 2:
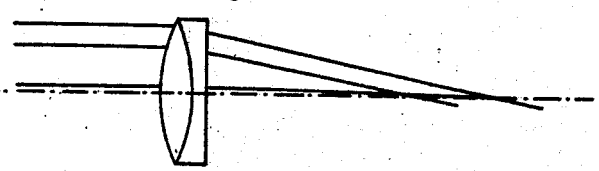
Figure 3:
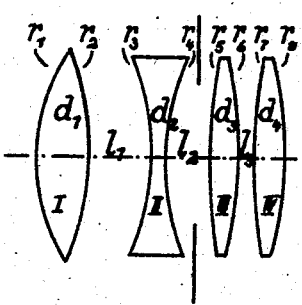
Figure 4:
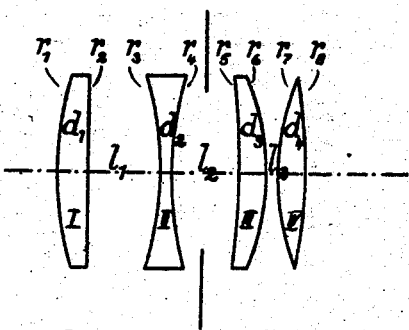

In the accompanying drawing Fig. 1 is a diagrammatic section of a known objective lens system composed of three single lenses. Fig. 2 shows the zonal aberration in a lens system which is corrected for spherical aberration. Fig. 3 is a diagrammatic section of an objective lens system comprising lenses embodying my invention. Fig. 4 is a similar view of a modification of the objective lens system shown in Fig. 3.

It is known that the spherical and chromatic aberration, astigmatism, distortion and coma can be corrected in a lens system which is made up of two collective lenses enclosing a dispersive lens. Such a lens system is shown in Fig. 1. The greatest useful relative aperture in a lens of this type is about one third of the equivalent focus. For larger relative apertures than one third the aberrations of the spherical zones become so great as to make a sharp image impossible. A lens system is called corrected for spherical aberration when the paraxial ray and the ray that enters the lens parallel to the optical axis at the margin of the lens meet in the same point on the optical axis.

Other parallel rays that lay between the paraxial and marginal ray do not cross the optical axis in the same point as these two rays. The distance between these two crossing points is called the aberration of the spherical zones.

Fig. 2 gives an illustration of the position of these rays in the simplest form of a spherically corrected lens system, the cemented doubled.

To reduce the aberrations of the spherical zones I have made the third lens of Fig. 1 of two collective lenses the individual focal lengths of which must have a certain relation to the focal lengths of the combined lens system.

Accordingly in carrying out the present invention the objective lens system comprises four lenses and is shown in Fig. 3. Lens I is a collective lens facing the incident light rays, lens II is a dispersive lens that takes up the rays that are made convergent by lens I and makes them divergent, lens III makes the rays that have traversed lens II convergent and lens IV converges them still more. Between lens II and III a diaphragm is placed.

Of the lenses III and IV one must have a focal length that is not more than twice the focal length of the combined lens system consisting of lenses I to IV and the focal length of the other must be smaller than the focal length of the combined lens system I to IV.

The shorter lens may be placed nearer the diaphragm than the longer lens or this position may be reversed.

Fig. 3.—$Focus=100$ mm. $Diameter=42$ mm.

$$\begin{array}{llll} & & n_D & n_{G'} \\ r_1+47.4 & d_1=7.3 & \text{I } 1.60960 & 1.62273 \\ r_2-680.4 & & & \\ r_3-53.1 & l_1=15.0 & & \\ r_4+47.4 & d_2=2.0 & \text{II } 1.64927 & 1.67489 \\ r_5+163.3 & l_2=6.1 & & \\ r_6-172.1 & d_3=4.1 & \text{III } 1.60960 & 1.62273 \\ r_7+544.3 & l_3=1.4 & & \\ r_8-49.0 & d_4=5.8 & \text{IV } 1.60960 & 1.62273 \\ \end{array}$$

Focus of lens III=
  1.35 × focus of combined objective
Focus of lens IV=
  0.72 × focus of combined objective Fig. 4.—$Focus=100$ mm. $Diameter=50$ mm.

$$\begin{array}{llll} r_1+56.0 & & & \\ & & n_D & n_{G'} \\ r_2-1500.0 & d_1=9.0 & \text{I } 1.60958 & 1.62273 \\ r_3-55.0 & l_1=17.0 & \text{II } 1.67330 & 1.70141 \\ r_4+80.0 & d_2=2.5 & & \\ r_5-373.0 & l_2=12.0 & \text{III } 1.60958 & 1.62273 \\ r_6-48.0 & d_3=7.0 & & \\ r_7+194.0 & l_3=1.5 & \text{IV } 1.60958 & 1.62273 \\ r_8-194.0 & d_4=5.0 & & \\ \end{array}$$

Focus of lens III=
  0.87 × focus of combined objective
Focus of lens IV=
  1.56 × focus of combined objective In Fig. 3 a lens system is shown according to my invention having the lens of longer focus near the diaphragm and in Fig. 4 having the lens of shorter focus near the diaphragm.

To obtain the best correction of all aberrations it is essential that one of the two collective lenses on the side of the diaphragm that is turned away from the incident light have its weaker curvature facing the diaphragm and the other its stronger curvature or that one of these lenses have both curves alike.

The data for making an objective lens system according to my invention are shown in Figs. 3 and 4. The characters $r_1$ to $r_8$ inclusive indicate the radii of curvature of the lenses from left to right respectively. The light is presumed to be incident from left to right and all curvatures that are convex toward the incident light are positive and those that are concave are negative.

The characters $d$ with the subnumerals indicate the axial dimensions of the glass thicknesses and the characters $l$ the air spaces measured on the optical axis.

The characters $n_D$ and $n_{G'}$ respectively denote the refractive indices for the D line and for the G' line of the spectrum and the glasses of which the lenses I, II, III, IV are made.

Utilization of the principles of the present invention affords a lens system in which the spherical and chromatic aberrations, astigmatism, distortion and coma are corrected and having a very large relative aperture.

I claim as my invention:

In an objective lens system for photographic, microscopic, projection, and similar purposes, the combination of four lenses, to wit, a collective and a dispersive lens separated by an air space and situated on a side of the diaphragm facing the incident light and two collective lenses separated by an air space on the rear side of the diaphragm one of these collective lenses having its focal length not longer than twice and the other not greater than the focal length of the combined objective lens and one of these collective lenses at the rear of the diaphragm having its weaker curvature facing the diaphragm.

In testimony whereof I affix my signature in presence of two witnesses.

WILLIAM F. BIELICKE.

Witnesses:
 HUGH GRAVES, Jr.,
 VLAD. ENDERS.